Sept. 5, 1967     J. D. RICHARD     3,339,417
WATER SAMPLING APPARATUS
Filed Nov. 19, 1964     2 Sheets-Sheet 1
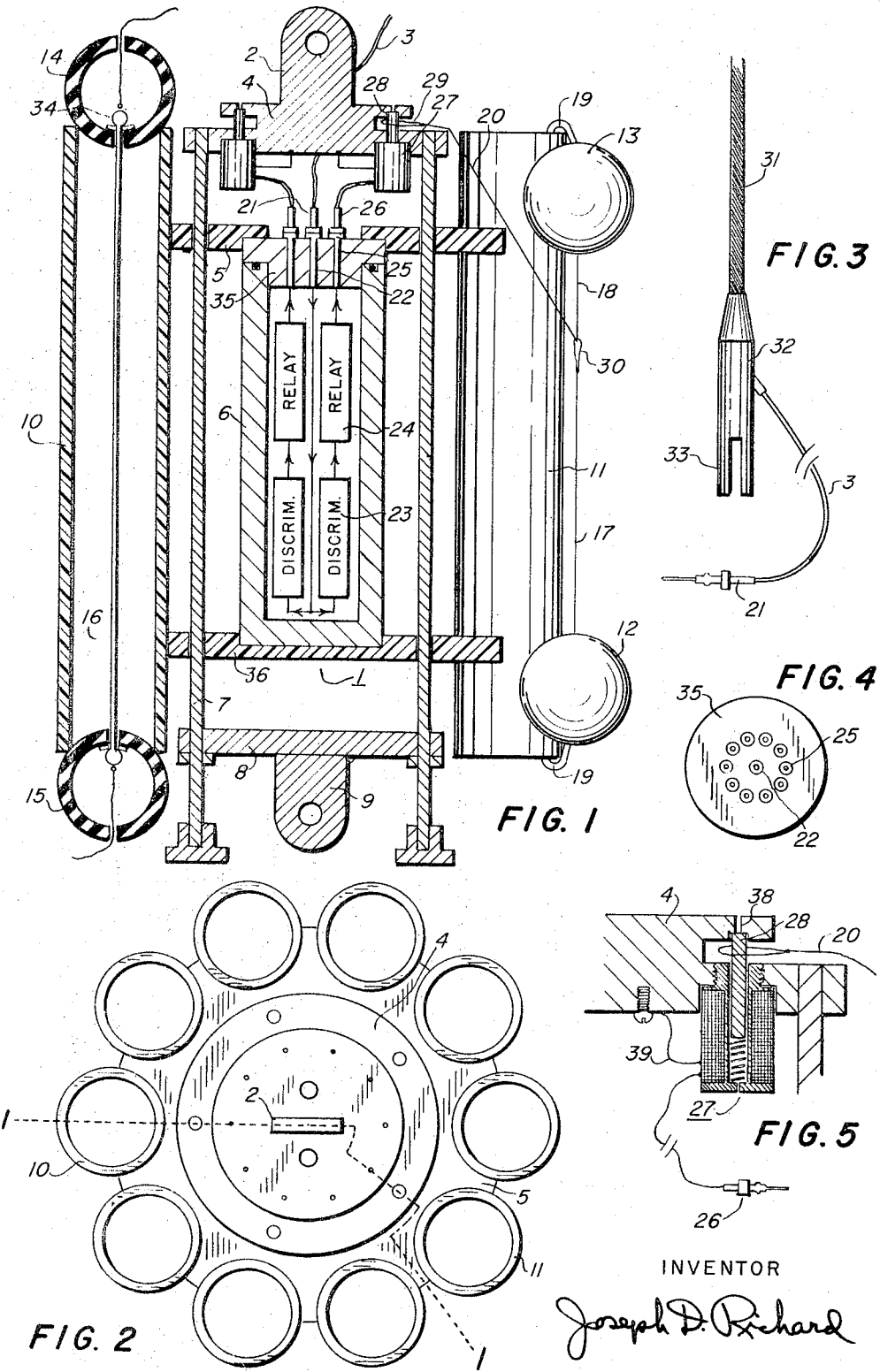
INVENTOR
Joseph D. Richard Sept. 5, 1967  J. D. RICHARD  3,339,417
WATER SAMPLING APPARATUS
Filed Nov. 19, 1964  2 Sheets-Sheet 2

INVENTOR
Joseph D. Richard

United States Patent Office 3,339,417
Patented Sept. 5, 1967

3,339,417
WATER SAMPLING APPARATUS
Joseph D. Richard, 3613 Loquat Ave.,
Miami, Fla. 33133
Filed Nov. 19, 1964, Ser. No. 412,541
10 Claims. (Cl. 73—425.4)

ABSTRACT OF THE DISCLOSURE

Water sampling apparatus having a plurality of remotely actuated sampling bottles. The assembly, including a watertight control housing, is lowered into the water on a wire with the sampling bottles latched in the open position. Signals from above the surface are received within the control housing where they trigger the sequential closure of the sampling bottles.

This invention relates generally to apparatus for sampling a liquid medium and more particularly to apparatus for obtaining samples at various discrete depths in a liquid medium such as sea water.

In oceanographic research it is frequently necessary to obtain samples of water from a series of discrete depths in the ocean. Heretofore, these samples have been obtained by spacing individual sampling bottles along a wire as it is lowered into the sea. These sampling bottles have been closed successively by means of weighted messengers which slide along the wire. Generally, reversing thermometers are used to obtain the temperature of the water at the sampled depth. The pressure effect on an "unprotected" thermometer as compared to a companion "protected" thermometer is used as a measure of the depth of the water at which the sample was taken. Recently, telemetering techniques have been devised for recording temperature vs. depth aboard the oceanographic vessel as the measuring sensors are lowered into the ocean using an electrically conductive cable. However, there are a number of other characteristics of sea water of interest to oceanographers for which satisfactory in situ measuring techniques have not been devised. For this reason, it is still necessary to obtain sea water samples from a series of accurately known depths. The apparatus of the present invention is particularly intended for use with the various types of continuously recording electronic bathythermographs now coming into use.

It is the principal object of the present invention to provide a water sampling device for obtaining samples at a series of predetermined depths in the ocean.

It is a further object of the present invention to provide a water sampling device suitable for use with telemetering type temperature-depth recording systems.

Another object of the present invention is to provide a sea water sampling system wherein the individual samples may be obtained by electrical signals generated from above the surface.

The present invention provides seat water sampling apparatus having a plurality of individual sample bottles arranged around an electrically operated release mechanism. The sample bottles are lowered into the ocean in the open position at the end of an electrically conductive cable. Signals transmitted down the cable actuate the release mechanism which closes the sample bottles. The release mechanism for each sample bottle is responsive to a specific signal. In this manner each sample bottle can be closed independently from above the surface. A separate system, not included in this invention, should be used for continuously monitoring the depth of the sampling apparatus as it is lowered into the ocean.

Additional objects and advantages of the invention will become apparent from the following description, accompanying drawings, and appended claims.

FIGURE 1 shows a sectional view of the water sampling apparatus taken along the dotted line 1—1 in FIGURE 2 according to the present invention.

FIGURE 2 shows a top view of the apparatus shown in FIGURE 1.

FIGURE 3 shows the termination of the electrically conductive cable for lowering the sampling apparatus into the ocean.

FIGURE 4 shows the group of watertight electrical receptacles in the top of the pressure housing shown in FIGURE 1.

FIGURE 5 shows a detailed sectional drawing of one of the solenoid release mechanisms for the apparatus shown in FIGURE 1.

Figure 6:
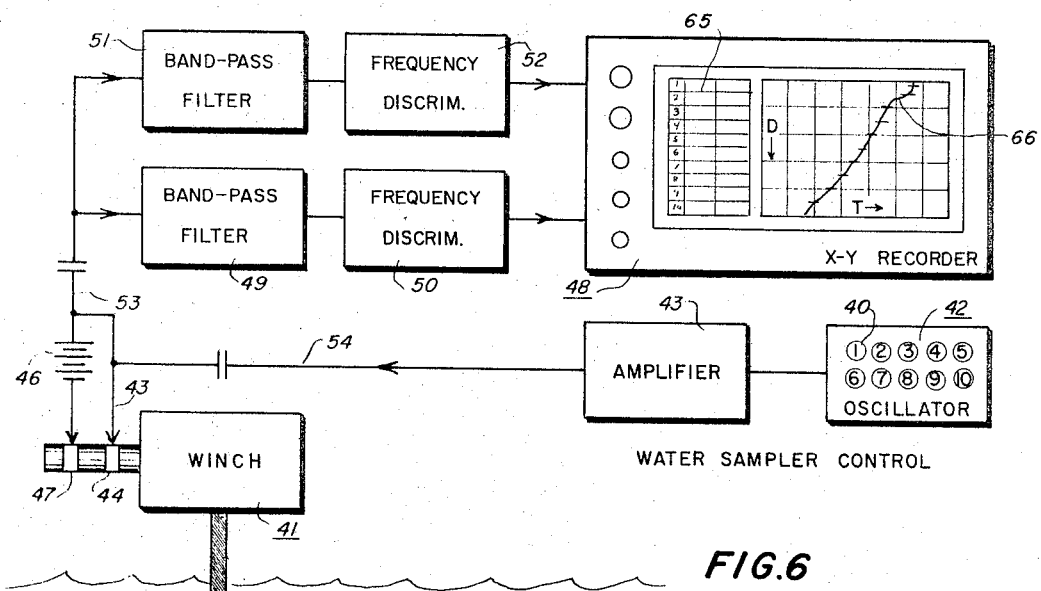
FIGURE 6 shows schematically and in block diagram the portion of the water sampling system which operates above the surface of the water.

Returning more specifically to FIGURE 1 the supporting frame 1 of the water sampling apparatus consists of an upper end piece 4 having a fitting 2 to which a suitable cable may be attached. A similar fitting 9 is attached to the lower end piece 8. A series of ten solenoid release mechanisms, such as the solenoid 27, are mounted within the upper end piece 4. A series of five rods, such as the rod 7, connect the upper end piece 4 with the lower end piece 8. The five rods pass through and retain in position the upper spacer disk 5 and the lower spacer disk 36. The upper and lower spacer disks 5 and 36 retain the housing 6 in position within the supporting frame 1. The housing 6 is both watertight and pressure resistant. An input receptacle 22 accommodates an input plug 21 through which modulated electrical signals may be connected into the discriminator 23 from the signal lead 3. FIGURE 4 shows the arrangement of electrical receptacles in the upper end plate 35 of the housing 6. The output of the discriminator 23 operates the relay 24 which energizes the solenoid 27 through the watertight output receptacle 25 and the plug 26. There are ten discriminators, relays, output receptacles, and solenoid releases in the water sampling apparatus shown in FIGURE 1. Each of the discriminators is responsive to only one of ten separate tone signals which may be fed into the housing 6 from the signal lead 3. Detection of the proper tone by any one of the discriminators results in the closure of the corresponding relay and actuation of the corresponding solenoid release. A series of ten water sampling bottles are spaced around the outer edge of the supporting frame 1 and are held in position by suitable indentations in the outer edge of the upper and lower spacer disks 5 and 36. A first water sampling bottle 10 is shown in the closed position. An elastic cord 16 serves as a closure spring to pull the ball lids 14 and 15 together to seal both ends of the sampling bottle 10. The ends of the elastic cord 16 are secured within the ball lids 14 and 15 by means of knots such as the knot 34. A second water sampling bottle 11 is shown in the open position. The plunger 28 of the solenoid 27 restrains the upper and lower ball lids 13 and 12 from closing the second sampling bottle 11. An elastic cord 19 or suitable spring means may be used to connect the two ball lids 13 and 12 under tension. The end portion of the release wire 20 is restrained by the latching action of the plunger 28 through the loop 29. The release wire passes through the loop 30 of the wire 17 and its other end 18 is secured to the ball lid 13. When the solenoid plunger 28 is retracted, the wire loop 29 is released so that the ball lids 13 and 12 snap into place and close the two ends of the second sampling bottle 11. The combination of the electrically operated solenoid 27 having a retractable plunger 28 passing through the loop 29 of the wire 20 serves as a latching means for restraining the sampling bottle 11 in the open position. The first sampling bottle 10 is shown in the closed position with the ball lids 14 and 15 being held in position by the elastic cord 16 under tension.

In FIGURE 2 a top view of the water sampling apparatus is shown including the upper end piece 4, the upper spacer disk 5, and the ten water sampling bottles such as 10 and 11. The sampling bottles are shown without the ball lids.

In FIGURE 3 a fitting 32 is shown attached to the end of an armored insulated cable 31 with the insulated signal lead 3 taken out to the waterproof plug 21. The clevis end 33 may be attached to the fitting 2 on the top of the water sampling apparatus shown in FIGURE 1. In FIGURE 4 a group of waterproof electrical receptacles are shown mounted in the upper end 35 of the housing 6.

In FIGURE 5 a solenoid 27 is shown mounted in the upper end piece 4 of the supporting frame 1 of the water sampling apparatus as shown in FIGURE 1. The solenoid plunger 28 restrains the release wire 20. A hole 38 in the upper end piece 4 allows the plunger 28 to be depressed by means of a pin so that the loop in the wire 20 may be inserted. One electrical lead 39 to the coil of the solenoid 27 is grounded to the upper end piece 4. A second lead to the coil of the solenoid 27 is connected to the waterproof plug 26.

Figure 7:
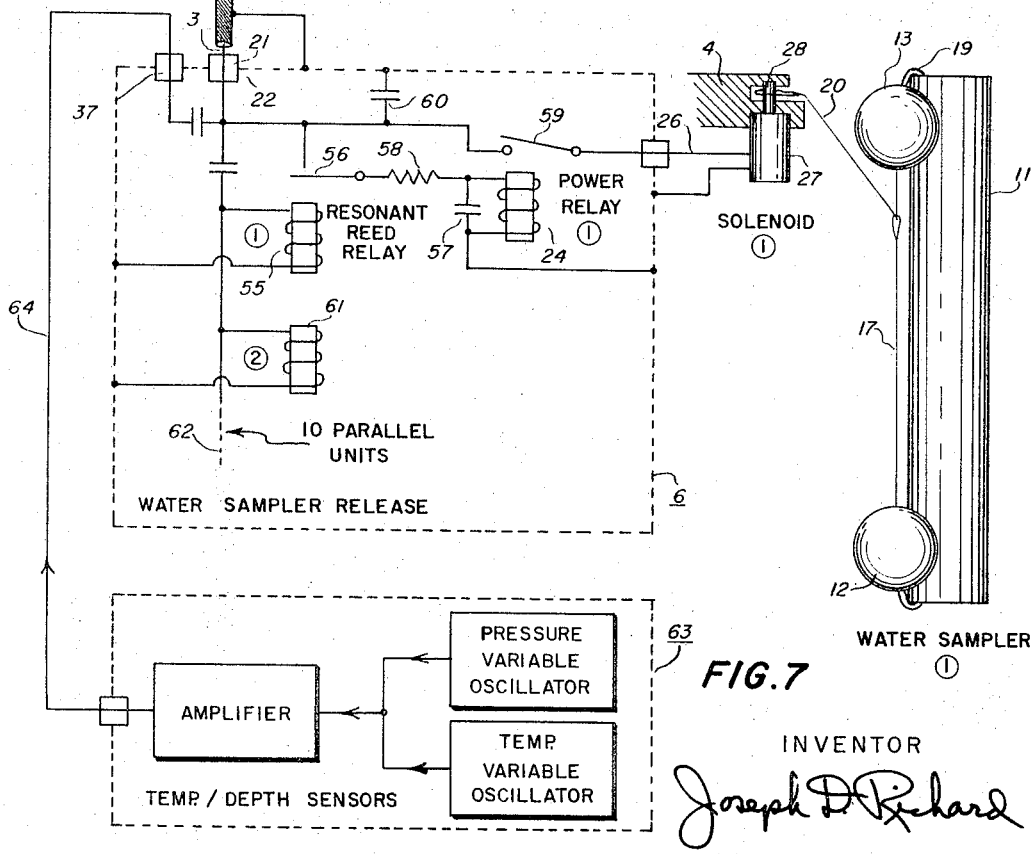
FIGURE 7 shows schematically and in block diagram the portion of the water sampling apparatus which operates below the surface of the water.

In FIGURE 6 a cable winch 41 is shown having an insulated armored cable 31 for lowering water sampling apparatus and temperature-depth measuring apparatus 63 into the ocean. Slip ring 44 connects the circuit 43 to the inner insulated conductor 3 of the armored cable 31. Slip ring 47 connects the negative side of the battery 46 to the outer armor of the cable 31. Electrical signals indicative of temperature and depth are generated by the measuring apparatus 63. The signal lead 64 from the temperature-depth measuring apparatus 63 passes through the watertight connector 37 and is coupled to the signal lead 3 of the cable 31. These signals are picked up through the lead 53 from the slip ring 44, separated by the filters 49 and 51, converted to analog voltages by the discriminators 50 and 52, and plotted as a temperature-depth diagram 66 on the X-Y recorder 48. The temperature-depth measuring and recording system shown in FIGURES 6 and 7 is typical of those which have been recently used in oceanographic work. The diagrams of FIGURES 6 and 7 show how the water sampling apparatus of the present invention may be used simultaneously with a temperature-depth telemetering system. An oscillator 42 has an output consisting of any one of ten frequencies selectable by the pushbutton switches such as the switch 40. The output of the oscillator 42 is amplified by the amplifier 43 and connected to the slip ring 44 by the leads 54 and 43. The ten selectable tone signals from the oscillator 42 may then be transmitted down the inner insulated conductor in the armored cable 31 and thence into the housing 6 through the waterproof plug 21 and receptacle 22. A series of ten resonant reed relays are mounted within the housing 6 with their coils such as the coils 55 and 61 connected in parallel between the signal lead 3 and the housing 6. Each of the resonant reed relays has a set of contacts 56 responsive to only one of the ten tone signals generated by the oscillator 42. The set of resonant relay contacts 56 connect the coil 24 of a power switching relay to the signal lead 3 which also carries a D.C. voltage from the battery 46. Thus when the pushbutton switch 40 of the oscillator 42 is depressed, a tone is generated which coincides with the resonant frequency of the reed contacts 56 of the resonant reed relay. The intermittent closure of the reed contact 56 connects the upper end of the power relay coil 24 to the positive D.C. voltage from the battery 46. The capacitor 60 provides a surge of current which facilitates the actuation of the solenoid 27. The power switch contacts 59 are then closed by the relay coil 24 so that the solenoid 27 is actuated, the plunger 28 retracted, and the wire 20 released. The resistor 58 and the capacitor 57 smooth the intermittent flow of current through the contacts 56. Although only one complete resonant reed relay, power relay, and solenoid release mechanism is shown within the housing 6 in FIGURE 7, it should be understood that ten duplicate systems are suggested, the additional reed relay coils being connected to the continuation of the lead 62. Each of the ten control circuits would be responsive to only one of the ten signal tones from the oscillator 42 and each control circuit would release the latching mechanism of only one of the ten water sampling bottles. Thus any one of the ten water sampling bottles can be closed by simply depressing the appropriate pushbutton on the oscillator 42. As mentioned before, the water sampler control would normally be operated while monitoring the depth of the sampling apparatus. A separate temperature-depth measuring and recording system is shown in FIGURES 6 and 7 for that purpose. The temperature-depth plot 66 of the X-Y recorder 48 is not precise enough as raw data. Therefore it would generally be desirable to record the exact values of temperature and depth as measured simultaneously with each sample taken. The exact values of temperature and depth would be determined by means of a digital counter not included in FIGURE 6. The values of temperature and depth corresponding to each sample taken can be written in the column 65 opposite the appropriate sample bottle number. It would be convenient to have markers along the plotted temperature-depth profile 66 to show each depth at which a sample bottle was actuated. This can be done by deriving a voltage pulse from the sudden increase of current from the battery 46 drawn by the solenoid 27 when the power relay contacts 59 are closed. A small portion of the derived pulse can be fed into the temperature channel of the X-Y recorder 48 through a capacitor. A series of such markers is shown in the trace 66 of the X-Y recorder 48 in FIGURE 6.

It may be seen therefore that the present invention provides a liquid sampling system which is particularly adaptable for use in oceanographic studies wherein water samples are required from a series of discrete depth in the ocean. Although one particular construction is shown in the drawings, a number of variations are quite practical.

The water sample release mechanism and signal discriminator may be powered by a battery included within the watertight housing as an alternative to the use of the electrical cable for both signaling and power. The cable shown in the drawing is a single insulated conductor wrapped with a galvanized external armor. This is the same cable commonly use in oil well logging.

The sampling mechanism may also be triggered by means of a wireless acoustic link system. In this alternate mode of operation, a modulated acoustic pulse is transmitted through the water and received by a transducer associated with the sampling apparatus. The resulting electrical signal is detected by the discriminator and the release mechanism actuated in the same manner as described previously. A transmitting amplifier and transducer plus a receiving transducer and amplifier would serve in place of the insulated signal cable in the apparatus shown. The water sampling apparatus could then be lowered by means of a conventional steel cable without electrical conductors. Acoustic link systems have proven satisfactory for remote triggering applications but they have not been very successful for the transmission of continuous data such as for temperature-depth profile telemetering. As a result, electric signaling type oceanographic cables are coming into common use in spite of the inconveniences and problems of slip rings on the winch. Thus the preferred mode of operation for the persent invention is to transmit the triggering pulses down the cable from which the water sampler is suspended.

Another alternate mode of operation would be the use of a single type of trigger pulse and a sequential type of release mechanism for closing the water sample bottles. Only one signal discriminator would be required. Reception of each repetitive, identical trigger pulse would result in the sequential closure of a water sampling bottle. This could be accomplished by means of either a stepping switch connected to a series of release mechanisms or else by a sequential type electromechanical release mechanism. However, a sequential type of release mechanism for the water sampler would introduce uncertainty about which sample bottle was closed at which depth if the sequence were disturbed for some reason. Also the overall reliability would be greatly reduced. Therefore, the preferred mode of operation is the use of a separate trigger signal, discriminator, and release mechanism for each water sampling bottle.

The water sampling bottles in FIGURE 1 do not show drain valves. However in actual practice it is preferred that each bottle have a drain valve for simplifying the removal of the water samples. A typical capacity for the water sample bottles would be one liter although obviously a wide range of bottle sizes can be accommodated. A Teflon lining is preferred for the solenoid plunger to reduce friction in the operation of the release mechanism. The solenoid coils are vacuum potted in plastic so that they are waterproof and resistant to damage by hydrostatic pressure.

Discrete tone signaling from a multiple frequency or series of fixed frequency oscillators is the preferred method for triggering the closure of the water sampling bottles. A series of resonant reed relays is the preferred method of frequency discrimination. Obviously other methods of remote signaling could be used, particularly if a sequential type of mechanism were used for the water sampler release.

The preferred materials of construction for the water sampling apparatus is as follows: stainless steel supporting frame and housing; plastic such as PVC for the spacer disks and water bottles; hard rubber for the ball type end plugs; and surgical rubber tubing for the elastic cord used to close the plugs.

In conclusion, while I have described particular embodiments of my invention for purposes of illustration, it will be understood that various modifications and adaptations thereof may be suggested to those skilled in the art without departing from the spirit and scope of the invention as defined in the following claims.

Having thus fully described my invention, I claim:

1. Apparatus for obtaining a series of water samples at predetermined depths in the ocean comprising: a source of energy pulses operable above the surface of the ocean; means for transmitting the aforementioned pulses into the ocean; a watertight and pressure resistant housing adaptable for lowering into the ocean; means for attaching the said housing to a cable suitable for lowering into the ocean; means within the said housing for receiving the aforementioned transmitted pulses; a series of water sampling bottles attached to the said housing each of the said bottles having openable lids at both top and bottom; spring means associated with each of the said lids for urging them into the closed position; latching means associated with each of the said bottles for restraining the said lids in the open position; means for sequentially releasing the said latching means in response to sequential pulses received by the said pulse receiving means, the said water sampling bottles being thereby sequentially closed.

2. Apparatus for obtaining a series of water samples at predetermined depths in the ocean comprising: a source of energy pulses operable above the surface of the ocean; means for transmitting the aforementioned pulses into the ocean; a watertight and pressure resistant housing adaptable for lowering into the ocean; means for attaching the said housing to a cable suitable for lowering into the ocean; means within the said housing for receiving the aforementioned transmitted pulses; a plurality of water sampling bottles attached to the said housing, each of the said bottles having openable lids at both top and bottom; spring means associated with each of the said lids for urging them into the closed position; electromechanical latching means associated with each of the said bottles for restraining the said pair of lids in the open position; an electrical power supply within the said housing; sequential switching means responsive to the aforementioned received pulses for sequentially connecting the said electrical power to each of the said electromechanical latching means, the said water sampling bottles being thereby sequentially closed in response to the reception of sequential pulses transmitted from above the surface of the ocean.

3. Apparatus for obtaining a series of water samples at predetermined depths in the ocean comprising: pulse generating means operable above the surface of the ocean, the said pulse generating means having an output signal with a frequency characteristic selectable from a series of predetermined frequencies; means for transmitting the aforementioned pulses into the ocean; a watertight and pressure resistant housing adaptable for lowering into the ocean; means for attaching the said housing to a cable suitable for lowering into the ocean; means within the said housing for receiving the aforementioned transmitted pulses; a plurality of water sampling bottles attached to the said housing, each of the said bottles having openable lids at both top and bottom; spring means associated with each of the said lids for urging them into the closed position; electromechanical latching means associated with each of the said bottles for restraining the said pair of lids in the open position; frequency discriminating means within the said housing for selectively detecting the aforementioned received pulses, the said frequency discriminating means having a separate output for each of the aforementioned predetermined frequencies; switching means for releasing the said electromechanical latching means in response to the output signals from the said frequency discriminating means, each latching means being released in response to the reception of a specific frequency from the said series of predetermined frequencies so that the corresponding water sampling bottle is thereby closed.

4. Water sampling apparatus of the character described comprising: signal generating means having an output selectable from a series of specific and predetermined frequencies; switching means for selecting any one of the said specific frequencies; means for transmitting a pulse of energy of the aforementioned selected frequency into the ocean; a watertight and pressure resistant housing adaptable for lowering into the ocean; means for attaching the said housing to a cable suitable for lowering into the ocean; means within the said housing for receiving the aforementioned transmitted pulses; a plurality of water sampling bottles attached to the said housing, each of the said bottles having openable lids at both top and bottom; spring means associated with each of the said lids for urging them into the closed position; mechanical latching means associated with each of the said bottles for restraining the said pair of lids in the open position; a series of frequency discriminating means within the said housing connected to the said pulse receiving means, each of the said frequency discriminating means being responsive to a different frequency from the aforementioned series of specific frequencies; a series of switching means within the said housing each responsive to the output a different one of the said frequency discriminating means; and a series of electromechanical release means each associated with one of the said mechanical latching means, each of the said release means being operable by a different one of the said switching means.

5. Apparatus for obtaining a series of water samples at predetermined depths in the ocean comprising: electrical pulse generating means operable above the surface of the ocean; switching means for sequentially activating the said pulse generating means; means for coupling the output signal of the said pulse generating means to an electrical conductor of an insulated cable suitable for lowering instruments into the ocean; a watertight and pressure resistant housing adaptable for lowering into the ocean; means for attaching the said housing to an electrical cable of the character described; a plurality of water sampling bottles attached to the said housing, each of the said bottles having openable lids at both top and bottom; spring means associated with each of the said lids for urging them into the closed position; electromechanical latching means associated with each of the said bottles for restraining the said lids in the open position; an electrical power supply within the said housing; electrical pulse discriminating means within the said housing; means for electrically connecting the input of the said pulse discriminating means to a signal lead of a cable of the character described to which the said housing is attached; and sequential switching means responsive to the output of the said pulse discriminating means for sequentially connecting the said electrical power to each of the said electromechanical latching means, the said water sampling bottles being thereby sequentially closed in response to sequential electrical pulses from the said pulse generating means.

6. Apparatus for obtaining a series of water samples at predetermined depths in the ocean comprising: signal generating means, operable above the surface of the ocean, having an output signal selectable from a series of specific and predetermined frequencies; switching means for selecting any one of the said specific frequencies; means for coupling the output of the said signal generator to an electrical conductor of an insulated cable suitable for lowering instruments into the ocean; a watertight and pressure resistant housing adaptable for lowering into the ocean; means for attaching the said housing to an electrical cable of the character described; a plurality of water sampling bottles attached to the said housing, each of the said bottles having openable lids at both top and bottom; spring means associated with each of the said lids for urging them into the closed position; latching means associated with each of the said bottles for restraining the said pair of lids in the open position; a series of frequency discriminating means within the said housing each responsive to one different frequency from the aforementioned series of specific frequencies; means for electrically connecting the inputs of the said series of frequency discriminators to a signal lead of a cable of the character described to which the said housing is attached; a series of switching means within the said housing each responsive to the output of a different one of the said frequency discriminating means; and a series of electromechanical release means each associated with one of the said mechanical latching means, each of the said release means being operable by a different one of the said switching means.

7. Water sampling apparatus of the character described for use with remote signaling means wherein energy pulses of a specific and predetermined frequency are sequentially transmitted into the ocean, the apparatus comprising: a submersible housing adaptable for lowering into the ocean; means for attaching the said housing to a cable suitable for lowering into the ocean; means within the said housing for receiving energy pulses transmitted from above the surface of the ocean; a plurality of water sampling bottles attached to the said housing, each of the said bottles having openable lids at both top and bottom; spring means associated with each of the said lids for urging them into the closed position; electromechanical latching means associated with each of the said bottles for restraining the said pair of lids in the open position; an electrical power supply within the said housing; frequency discriminating means within the said housing connected to the said pulse receiving means; sequential switching means, responsive to the output of the said frequency discriminator, for sequentially connecting the said electrical power to each of the said electromechanical latching means, the said water sampling bottles being thereby sequentially closed in response to the reception of the aforementioned sequential pulses transmitted from above the surface of the ocean.

8. Water sampling apparatus of the character described wherein energy pulses selected from a series of specific and predetermined frequencies are transmitted into the ocean, the apparatus comprising: a submersible structure including a watertight housing adaptable for lowering into the ocean; means for attaching the said structure to a cable suitable for lowering into the ocean; means within the said housing for receiving energy pulses transmitted from above the surface of the ocean; a series of water sampling bottles attached to the said structure, each of the said bottles having openable lids at both top and bottom; spring means associated with each of the said lids for urging them into the closed position; latching means associated with each of the said bottles for restraining the said pair of lids in the open position; a series of frequency discriminating means within the said housing connected to the said pulse receiving means, each of the said frequency discriminating means being responsive to one different frequency from the aforementioned series of specific frequencies; a series of switching means within the said housing each responsive to the output of a different one of the said frequency discriminating means; and a series of electromechanical release means each associated with one of the said mechanical latching means, each of the said release means being operable by a different one of the said switching means.

9. Water sampling apparatus of the character described wherein electrical pulses selected from a series of specific and predetermined frequencies are transmitted down a cable adaptable for lowering instruments into the ocean, the apparatus comprising: a submersible frame structure enclosing a watertight and pressure resistant housing suitable for lowering into the ocean; means for attaching the said frame structure to a cable of the character described; means within the said housing for receiving electrical pulses transmitted down the cable to which the said frame structure is attached; a series of water sampling bottles attached to the said frame structure, each of the said bottles having openable lids at both top and bottom; spring means associated with each of the said lids for urging them into the closed position; latching means associated with each of the said bottles for restraining the said pair of lids in the open position; a series of resonant reed relays within the said housing having their signal coils connected to the said electrical pulse receiving means, each of the said resonant reed relays being responsive to a different frequency from the aforementioned series of specific frequencies; and a series of electromechanical release means each associated with one of the said mechanical latching means, each of the said release means being operable by a different one of the said resonant reed relays.

10. Water sampling apparatus of the character described wherein electrical pulses selectable from a series of specific frequencies are transmitted down an electrically conductive cable adaptable for lowering instruments into the ocean, the apparatus comprising: a submersible frame structure enclosing a housing suitable for lowering into the ocean; means for attaching the said frame structure to a cable of the character described; means within the said housing for receiving electrical pulses transmitted down the aforementioned cable to which the said frame structure is attached; a series of water sampling bottles attached to the said frame structure, each of the said bottles having openable lids at both top and bottom; spring means associated with each of the said lids for urging them into the closed position;

latching means associated with each of the said bottles for restraining the said pair of lids in the open position; a series of resonant reed relays within the said housing having their inputs connected to the said electrical pulse receiving means, each of the said resonant reed relays being responsive to a different frequency from the aforementioned series of specific frequencies; a series of switching means within the said housing each responsive to the output of a different one of the said resonant reed relays; and a series of electromechanical release means each associated with one of the said mechanical latching means, each of the said release means being operable by a different one of the said switching means.

References Cited

UNITED STATES PATENTS

| | | | |
|---|---|---|---|
| 2,155,442 | 4/1939 | Parkhurst | 73—421 X |
| 2,314,372 | 3/1943 | Spilhaus | 73—425.4 |
| 3,135,943 | 6/1964 | Richard | 73—170 X |
| 3,176,517 | 4/1965 | Chelminski | 73—170 X |

LOUIS R. PRINCE, *Primary Examiner.*

D. M. YASICH, *Assistant Examiner.*